United States Patent
Ding et al.

(10) Patent No.: US 11,847,150 B2
(45) Date of Patent: Dec. 19, 2023

(54) METHOD AND APPARATUS FOR TRAINING RETRIEVAL MODEL, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Yuchen Ding, Beijing (CN); Yingqi Qu, Beijing (CN); Jing Liu, Beijing (CN); Kai Liu, Beijing (CN); Dou Hong, Beijing (CN); Hua Wu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 266 days.

(21) Appl. No.: 17/407,320

(22) Filed: Aug. 20, 2021

(65) Prior Publication Data

US 2022/0100786 A1 Mar. 31, 2022

(30) Foreign Application Priority Data

Sep. 25, 2020 (CN) .......................... 202011023354.X

(51) Int. Cl.
*G06F 16/33* (2019.01)
*G06N 20/20* (2019.01)

(52) U.S. Cl.
CPC ...... *G06F 16/3347* (2019.01); *G06F 16/3344* (2019.01); *G06N 20/20* (2019.01)

(58) Field of Classification Search
CPC .................................................. G06F 16/3347
See application file for complete search history.

(56) References Cited

U.S. PATENT DOCUMENTS

2016/0335263 A1* 11/2016 Yin .................. G06F 16/24578
2018/0330280 A1* 11/2018 Erenrich ................ G06N 20/00
2021/0209463 A1* 7/2021 Xu .......................... G06N 3/045

FOREIGN PATENT DOCUMENTS

JP 2012108867 A 6/2012
JP 2018194919 A 12/2018

OTHER PUBLICATIONS

Extended European Search Report of European patent application No. 21186434.8 dated Jan. 4, 2022, 2 pages.
(Continued)

*Primary Examiner* — Van H Oberly
(74) *Attorney, Agent, or Firm* — Brooks Kushman P.C.

(57) ABSTRACT

The present application discloses a method and apparatus for training a retrieval model, device and computer storage medium that relate to intelligent search and natural language processing technologies. An implementation includes: acquiring initial training data; performing a training operation using the initial training data to obtain an initial retrieval model; selecting texts with the correlation degrees with a query in the training data meeting a preset first requirement from candidate texts using the initial retrieval model; performing a training operation using the updated training data to obtain a first retrieval model; and selecting texts with the correlation degrees with the query in the training data meeting a preset second requirement from the candidate texts using the first retrieval model; and/or selecting texts with the correlation degrees with the query meeting a preset third requirement; and performing a training operation using the expanded training data to obtain a second retrieval model.

18 Claims, 9 Drawing Sheets

(56) References Cited

OTHER PUBLICATIONS

Li et al., "Semi-supervised document retrieval", Information Processing & Management, Elsevier, Barking, GB, vol. 45, No. 3, May 2009 (May 2009), pp. 341-355, XP026043932, ISSN: 0306-4573, DOI: 10.1016/J.IPM.2008.11.002, [retrieved on Apr. 17, 2009].

* cited by examiner

METHOD AND APPARATUS FOR TRAINING RETRIEVAL MODEL, DEVICE AND COMPUTER STORAGE MEDIUM

CROSS-REFERENCE TO RELATED APPLICATIONS

The present application claims the priority of Chinese Patent Application No. 202011023354.X, filed on Sep. 25, 2020, with the title of "Method and apparatus for training retrieval model, device and computer storage medium." The disclosure of the above application is incorporated herein by reference in its entirety.

TECHNICAL FIELD

The present application relates to the technical field of computers, and particularly to intelligent search and natural language processing technologies.

BACKGROUND

In the information age, people wish to rapidly find required information from massive texts, and therefore, an information retrieval technology becomes essential. With the popularization and development of deep neural networks, the information retrieval technology is also changed greatly, and various pre-trained language models are applied to the field of information retrieval as retrieval models, which brings remarkable effect improvement.

A large amount of training data which is annotated manually is required in the training process of the retrieval model, and the final effect of the retrieval model is directly determined by the quantity and quality of the training data. However, high-quality training data is quite valuable, and how to reduce the requirement for the high-quality training data in the model training process on the premise of guaranteeing the model effect becomes a problem to be solved urgently.

SUMMARY

In view of this, the present application provides a method and apparatus for training a retrieval model, a device and a computer storage medium, so as to reduce the requirement for high-quality training data in a model training process on the premise of guaranteeing a model effect.

In a first aspect, the present application provides a method for training a retrieval model, including: acquiring initial training data, the initial training data including queries and relevant positive text examples and relevant negative text examples corresponding to the queries; and performing a training operation using the initial training data to obtain an initial retrieval model; selecting texts with the correlation degrees with the query in the training data meeting a preset first requirement from candidate texts using the initial retrieval model, so as to update the relevant negative text examples corresponding to the query; and performing a training operation using the updated training data to obtain a first retrieval model; and selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the expanded training data to obtain a second retrieval model.

In a second aspect, the present application provides an electronic device, comprising: at least one processor; and a memory communicatively connected with the at least one processor; wherein the memory stores instructions executable by the at least one processor, and the instructions are executed by the at least one processor to enable the at least one processor to perform a method for training a retrieval model, wherein the method comprises: acquiring initial training data, the initial training data including queries and relevant positive text examples and relevant negative text examples corresponding to the queries; and performing a training operation using the initial training data to obtain an initial retrieval model; selecting texts with the correlation degrees with the query in the training data meeting a preset first requirement from candidate texts using the initial retrieval model, so as to update the relevant negative text examples corresponding to the query; and performing a training operation using the updated training data to obtain a first retrieval model; and selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the expanded training data to obtain a second retrieval model.

In a third aspect, the present application provides a non-transitory computer readable storage medium with computer instructions stored thereon, wherein the computer instructions are used for causing a computer to perform a method for training a retrieval model, wherein the method comprises: acquiring initial training data, the initial training data comprising queries and relevant positive text examples and relevant negative text examples corresponding to the queries; and performing a training operation using the initial training data to obtain an initial retrieval model; selecting texts with the correlation degrees with the query in the training data meeting a preset first requirement from candidate texts using the initial retrieval model, so as to update the relevant negative text examples corresponding to the query; and performing a training operation using the updated training data to obtain a first retrieval model; and selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the expanded training data to obtain a second retrieval model.

According to the above technical solution of the present application, in the process of training the retrieval model, the retrieval model obtained through the intermediate training operation is utilized to improve the quality of the negative examples in the training data and expand the positive examples and/or the negative examples in the training data, such that the requirement for the high-quality training data which is acquired initially is reduced on the premise of guaranteeing the retrieval effect in the training process of the retrieval model.

Other effects of the above-mentioned alternatives will be described below in conjunction with embodiments.

BRIEF DESCRIPTION OF THE DRAWINGS

The drawings are used for better understanding the present solution and do not constitute a limitation of the present application. In the drawings.

DETAILED DESCRIPTION

The following part will illustrate exemplary embodiments of the present application with reference to the drawings, including various details of the embodiments of the present application for a better understanding. The embodiments should be regarded only as exemplary ones. Therefore, those skilled in the art should appreciate that various changes or modifications can be made with respect to the embodiments described herein without departing from the scope and spirit of the present application. Similarly, for clarity and conciseness, the descriptions of the known functions and structures are omitted in the descriptions below.

Figure 1:
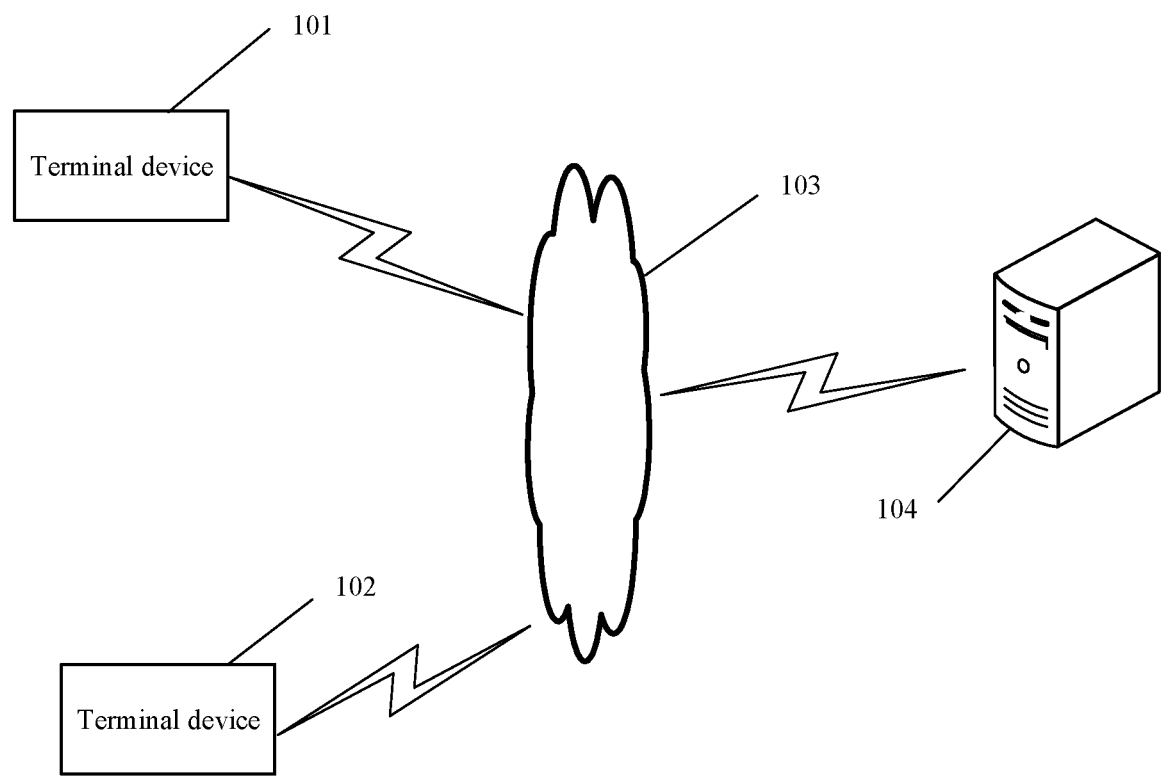
FIG. 1 shows an exemplary system architecture to which an embodiment of the present disclosure may be applied.

FIG. 1 shows an exemplary system architecture to which embodiments of the present disclosure may be applied. As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a search application, a voice interaction application, a web browser application, a communication application, or the like, may be installed on the terminal devices 101, 102.

The terminal devices 101, 102 may be configured as various electronic devices able to support and initiate information retrieval and display a retrieval result, including, but not limited to, smart phones, tablets, personal computers (PC), smart sound boxes, smart wearable devices, smart televisions, or the like. An apparatus according to the present disclosure may be provided and run in the above-mentioned server 104. The apparatus may be implemented as a plurality of pieces of software or software modules (for example, for providing distributed service), or a single piece of software or software module, which is not limited specifically herein.

For example, the apparatus for training a retrieval model is provided and run in the above-mentioned server 104, and the server 104 trains the retrieval model with a method according to the present application. When a retrieval request including a query from the terminal device 101 or 102 is received, a retrieval result returned to a user is determined using the trained retrieval model, and may be returned to the terminal device 101 or 102.

The server 104 may be configured as a single server or a server group including a plurality of servers. It should be understood that the numbers of the terminal devices, the network, and the server in FIG. 1 are merely schematic. There may be any number of terminal devices, networks and servers as desired for an implementation.

Figure 2:
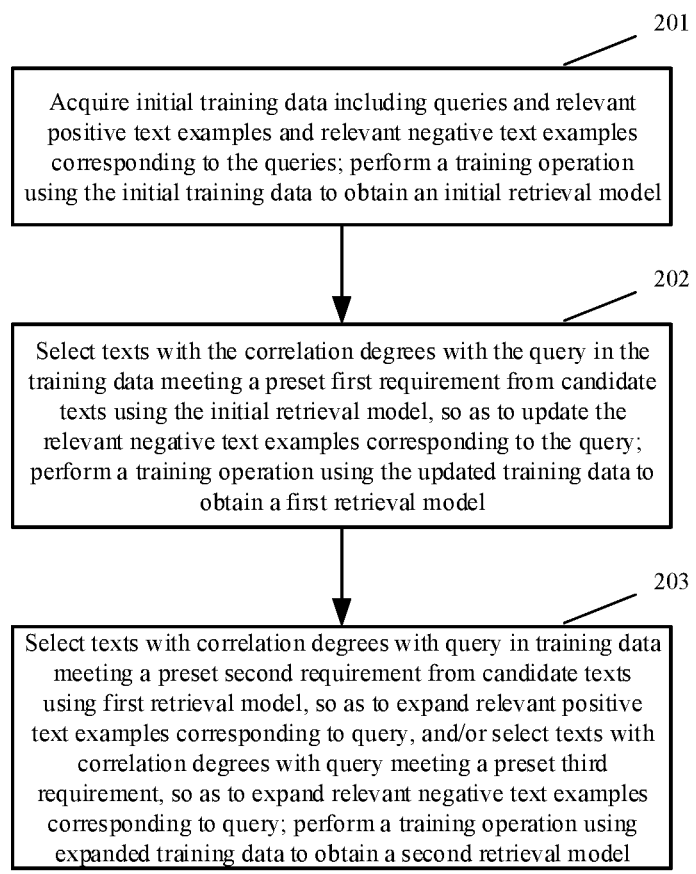
FIG. 2 is a flow chart of a main method for training a retrieval model according to an embodiment of the present application.

FIG. 2 is a flow chart of a main method for training a retrieval model according to an embodiment of the present application, and as shown in FIG. 2, the method may include the following steps:

201: acquiring initial training data, the initial training data including queries and relevant positive text examples and relevant negative text examples corresponding to the queries; and performing a training operation using the initial training data to obtain an initial retrieval model.

In the present application, when the training data is constructed initially, an artificial annotation set may be constructed firstly; that is, the relevant positive text examples of a batch of queries are manually annotated from the candidate texts, thereby guaranteeing the high quality of the relevant positive text examples in the training data. The relevant negative text examples corresponding to the query may be randomly selected from the candidate texts, and the number may be a preset value, for example, 4.

The candidate texts in the embodiment of the present application are related to specific application fields. For example, if a general web page search engine is adopted, the candidate texts are a huge number of web pages crawled by the search engine. In the case of a book search engine, the candidate texts are all book texts in a book database. If being papers in a specific field (such as the medical field), the candidate texts are massive papers in a paper database. If applied to a question-answer platform, the candidate texts are texts corresponding to all answers in a question-answer knowledge base, or the like.

Besides the above-mentioned manner, the relevant positive text samples may also be annotated in other manners, for example, acquired and annotated from a history search log of the user, and the manners are not exhaustive herein.

The initial training data may be used to train the initial retrieval model, and the retrieval model in the present application may be, for example, a dual model, a cross attention model, or the like. The training process for these models will be described in detail in the following embodiments.

202: selecting texts with the correlation degrees with the query in the training data meeting a preset first requirement from candidate texts using the initial retrieval model, so as to update the relevant negative text examples corresponding to the query; and performing a training operation using the updated training data to obtain a first retrieval model.

It is observed from the step 201 that when the training data is constructed, the relevant positive text examples of the query are accurate, but the relevant negative text examples of the query tend to be inaccurate. However, the negative examples have a great influence on the effect of the retrieval model, and therefore, this step is a process for improving the quality of the relevant negative text examples in the training data.

The accurate relevant positive text examples and the relevant negative text examples which are selected randomly already enable the initial retrieval model obtained by the training operation to have a certain effect, such that the initial retrieval model may be used for determining a part of negative examples strongly relevant to the query from the candidate texts, and the quality of the training data is improved after the training data is updated using the negative examples which are strongly relevant. The first retrieval model obtained by the training operation based on the updated training data has an effect which is further improved.

As a preferred implementation, in this step, the correlation degree between the query and each candidate text may be determined by the initial retrieval model, and M2 texts are randomly selected from the M1 candidate texts with top correlation degree scores to update the relevant negative text examples corresponding to the query, both M1 and M2 being positive integers, and M1>M2.

Besides the above-mentioned preferred implementation, the text meeting the preset first requirement may be selected in other manners, for example, the candidate texts with the correlation degree scores greater than a preset threshold are selected to update the relevant negative text examples corresponding to the query.

203: selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the expanded training data to obtain a second retrieval model.

After the above-mentioned step 202, the quality of the relevant negative text examples in the training data is improved, but for the training operation of the retrieval model, the numbers of the positive examples and the negative examples in the training data also play crucial roles, and influence the effect of the retrieval model greatly. Therefore, this step is a process for expanding the number of the relevant positive and/or negative text examples in the training data.

As a preferred implementation, in this step, the initial retrieval model may be first used to retrieve relevant texts of the query in the training data from the candidate texts; and then, the first retrieval model may be used to determine the correlation degrees of the relevant texts with the query, and the texts with the correlation degrees greater than or equal to a preset first threshold are used to expand the relevant positive text examples corresponding to the query, and/or the texts with the correlation degrees less than or equal to a preset second threshold are used to expand the relevant negative text examples corresponding to the query. The first threshold is greater than the second threshold, for example, the first threshold is 0.9, and the second threshold is 0.1. With the preferred implementation, the quantities of the relevant positive text examples and the relevant negative text examples are expanded, which improves the effect of the retrieval model obtained by the training operation; in addition, the quality of the relevant negative text examples is improved to a certain extent, which better improves the effect of the retrieval model.

Other implementations than the above-mentioned preferred implementation may also be adopted. For example, after the correlation degrees of the relevant texts with the query are determined by the first retrieval model, the relevant texts are ranked, the top several texts are used to expand the relevant positive text examples corresponding to the query, and the bottom several texts are used to expand the relevant negative text examples corresponding to the query. As another example, the correlation degree of each candidate text with the query is determined directly by the first retrieval model, and the texts with the correlation degrees greater than or equal to the preset first threshold are used to expand the relevant positive text examples corresponding to the query, and the texts with the correlation degrees less than or equal to the preset second threshold are used to expand the relevant negative text examples corresponding to the query.

After obtained in the above-mentioned embodiment, the second retrieval model may be used as a model for information retrieval. For example, after the query input by the user is input into the second retrieval model, the second retrieval model may determine the relevant texts corresponding to the query from the candidate texts.

Figure 3:
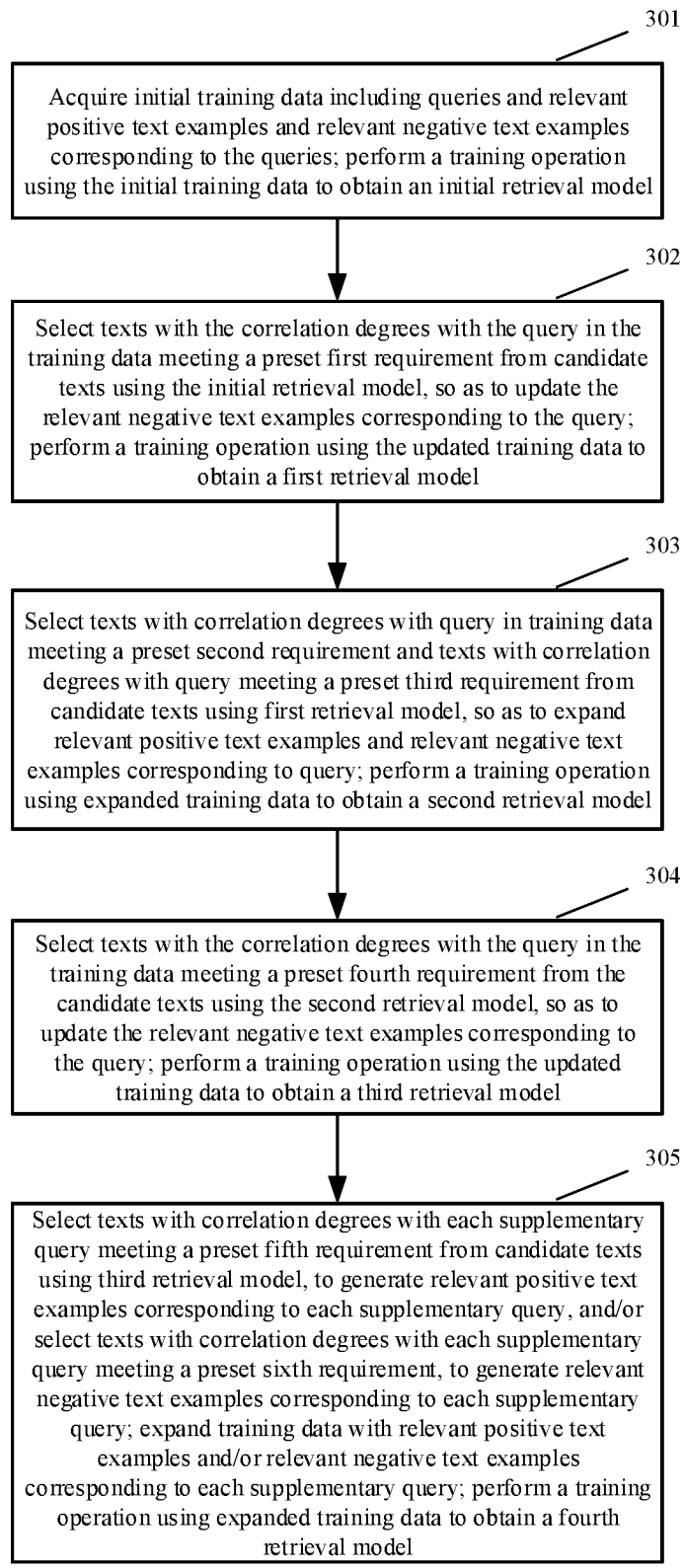
FIG. 3 is a flow chart of another method for training a retrieval model according to an embodiment of the present application.

Further, in addition to the training operation of the initial model and the training operations of the first retrieval model and the second retrieval model in the first round of training, a second round of training may be performed. As shown in FIG. 3, the process may include the following steps.

Steps 301 to 303 are the same as the steps 201 to 203 in the embodiment shown in FIG. 2, and are not repeated herein.

304: selecting texts with the correlation degrees with the query in the training data meeting a preset fourth requirement from the candidate texts using the second retrieval model, so as to update the relevant negative text examples corresponding to the query; and performing a training operation using the updated training data to obtain a third retrieval model.

In this step, the quality of the relevant negative text examples in the training data is further improved using the second retrieval model, and the stronger negative examples are found, thereby facilitating judgment of difficult samples by the retrieval model.

As a preferred implementation, the correlation degrees between the query and the candidate texts may be determined by the second retrieval model; N2 candidate texts are selected at an interval of N1 candidate texts according to the ranked correlation degrees; and then, the candidate texts with the similarity to the relevant positive text examples corresponding to the query greater than or equal to a preset similarity threshold are filtered out from the selected N2 candidate texts, and the obtained candidate texts are used to update the relevant negative text examples corresponding to the query. N1 and N2 are preset positive integers.

In the above description, the N2 candidate texts are selected at the interval of N1 candidate texts, for example, at an interval of 10 candidate texts, which may effectively prevent a large number of similar texts from appearing in the candidate texts. Then, the candidate texts with high similarity to the relevant positive text examples are filtered out from the selected texts, and the filtering operation is intended to prevent influences on the effect of the retrieval model caused by wrong selection of missed positive examples as the relevant negative text examples under some conditions. Finally, 4 relevant negative text examples are formed to replace the relevant negative text examples in the training sample corresponding to the query.

Other implementations than the above-mentioned preferred implementation may also be adopted to update the relevant negative text examples corresponding to the query. For example, after the correlation degrees between the query and the candidate texts are determined by the second retrieval model, the top several candidate texts may be selected to update the relevant negative text examples corresponding to the query.

305: selecting texts with the correlation degrees with each supplementary query meeting a preset fifth requirement from the candidate texts using the third retrieval model, so as to generate relevant positive text examples corresponding to each supplementary query, and/or selecting texts with the correlation degrees with each supplementary query meeting a preset sixth requirement, so as to generate relevant negative text examples corresponding to each supplementary query; expanding the training data with the relevant positive text examples and/or the relevant negative text examples corresponding to each supplementary query; and performing a training operation using the expanded training data to obtain a fourth retrieval model.

This step means further expansion of the relevant texts in the training data, including the expansion of the relevant positive text examples and/or the relevant negative text examples, thereby improving the effect of the retrieval model.

The supplementary query referred to in this step is a new query added into the training data. As a preferred implementation, in this step, the second retrieval model may be first used to retrieve the relevant texts of the query in the training data from the candidate texts; and the third retrieval model may be used to determine the similarity of the relevant texts with each supplementary query, and the texts with the similarity greater than or equal to a preset first threshold are used as the relevant positive text examples corresponding to each supplementary query, and/or the texts with the similarity less than or equal to a preset second threshold are used as the relevant negative text examples corresponding to each supplementary query. For example, the first threshold is 0.9, and the second threshold is 0.1.

Other implementations than the above-mentioned preferred implementation may also be adopted. For example, after the correlation degrees of the relevant texts with the query are determined by the third retrieval model, the relevant texts are ranked, the top several texts are used to expand the relevant positive text examples corresponding to the query, and the bottom several texts are used to expand the relevant negative text examples corresponding to the query. As another example, the correlation degree of each candidate text with the query is determined directly by the third retrieval model, and the texts with the correlation degrees greater than or equal to the preset first threshold are used to expand the relevant positive text examples corresponding to the query, and the texts with the correlation degrees less than or equal to the preset second threshold are used to expand the relevant negative text examples corresponding to the query.

After obtained in the above-mentioned embodiment, the fourth retrieval model may be used as the model for information retrieval. For example, after the query input by the user is input into the fourth retrieval model, the fourth retrieval model may determine the relevant texts corresponding to the query from the candidate texts.

In addition, in the above-mentioned embodiment, the initial retrieval model, the second retrieval model and the fourth retrieval model may have the same type, and the first retrieval model and the third retrieval model may have the same type. As a preferred implementation, in the training process, the second retrieval model may be obtained by performing a further training operation with the expanded training data on the basis of the obtained initial retrieval model. In the training process, the fourth retrieval model may be obtained by performing a further training operation with the expanded training data on the basis of the obtained second retrieval model. As a preferred implementation, in the training process, the third retrieval model may be obtained by performing a further training operation with the updated training data on the basis of the obtained first retrieval model.

Figure 4A:
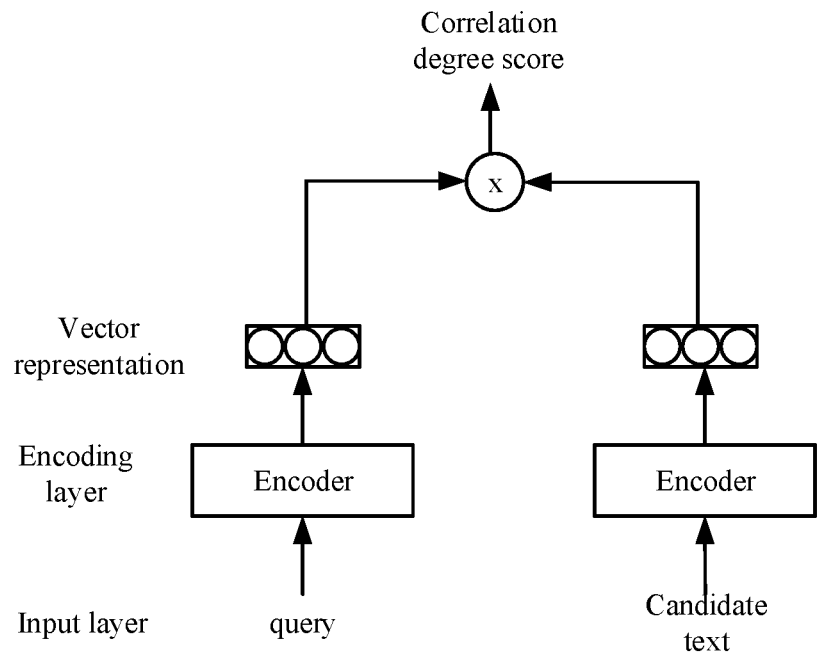
FIGS. 4a and 4b are schematic structural diagrams of a dual model and a cross attention model according to an embodiment of the present application.

Currently, two common models are mainly available in the field of information retrieval, one of which is a dual model. The dual model means that two encoders are adopted to encode the query and the candidate text respectively to obtain vector representations of the query and the candidate text, and then, the correlation degree (also called similarity) between the two vector representations is calculated by means of an inner product, or the like, to serve as a correlation score of the query and the candidate text. As shown in FIG. 4a, the structure with the two encoders is a dual-tower structure, and is therefore referred to as a dual model.

Figure 4B:
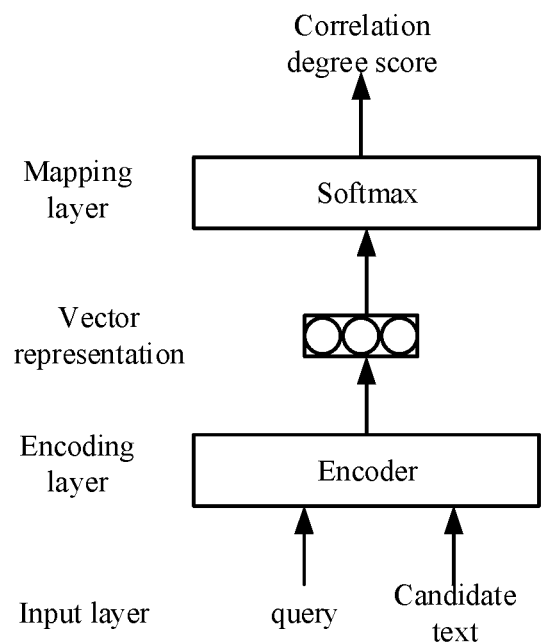

The other model is a cross attention model. The cross attention model means that the query and the candidate text are spliced, the spliced text is uniformly encoded with a cross attention mechanism, and then, the encoded result is mapped (Softmax) to obtain the correlation degree between the query and the candidate text, as shown in FIG. 4b.

The cross attention model has a good model effect, high accuracy and a low efficiency. The dual model has a high efficiency and an inferior effect to the cross attention model. In consideration of respective characteristics of the two models, the present application provides a preferred implementation in which the two above-mentioned models are applied to the training process of the retrieval model according to the present application, so as to take full advantage of respective advantages of the two models. Such a preferred implementation will be described below in detail in conjunction with embodiments.

Figure 5:
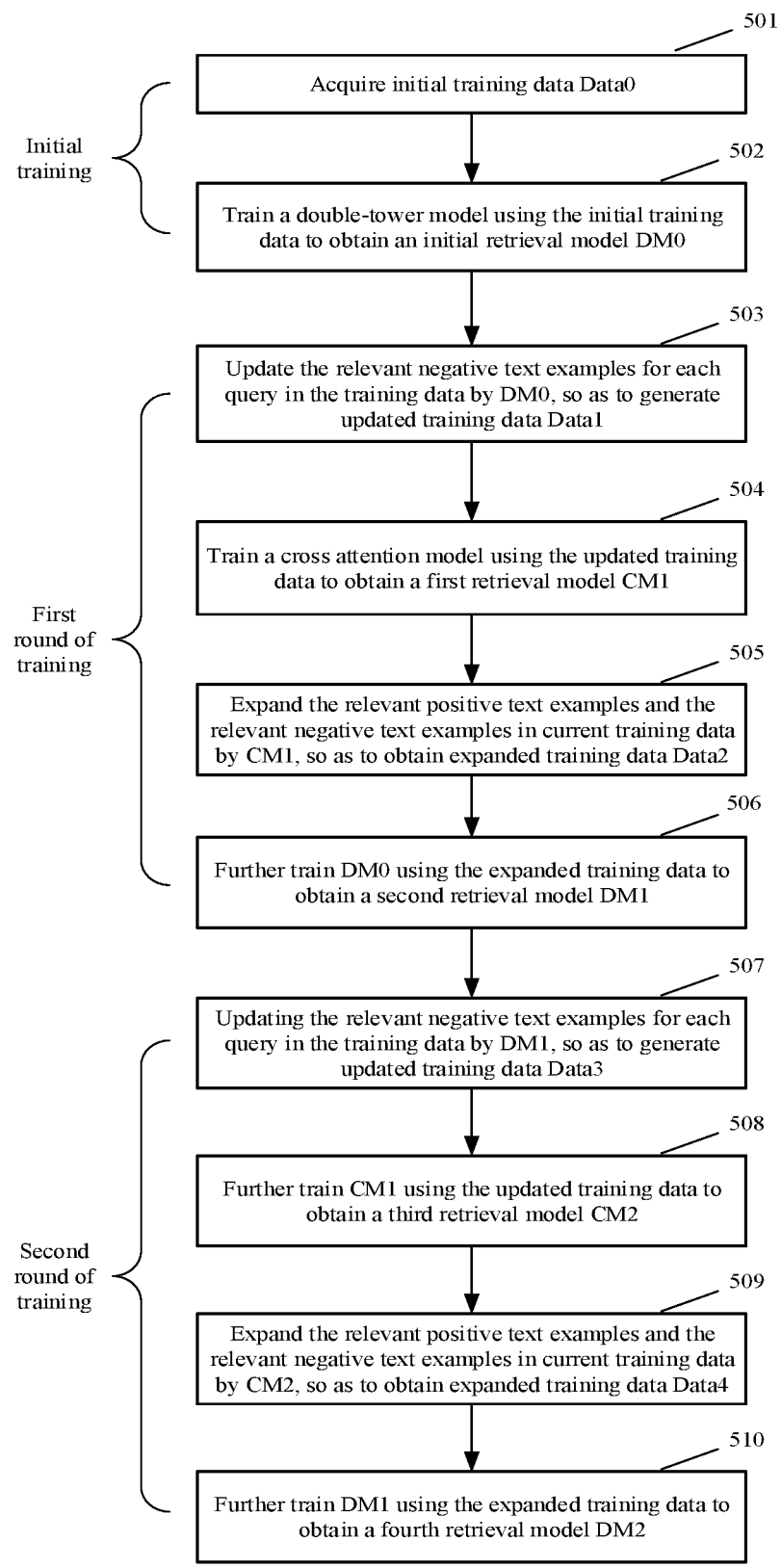
FIG. 5 is a flow chart of a preferred implementation according to an embodiment of the present application.

FIG. 5 is a flow chart of a preferred implementation according to an embodiment of the present application, and as shown in FIG. 5, the implementation may include the following steps:

501: acquiring initial training data which is denoted as Data0.

In this step, the initial training data includes a query and relevant positive text examples and relevant negative text examples corresponding to the query, the relevant positive text examples are annotated manually, and the relevant negative text examples are selected from candidate texts randomly.

In the present embodiment, two sets may be constructed: one is an artificial annotation set, a batch of queries input by a user is selected in advance, and the relevant positive text examples related to the queries are annotated from candidate texts manually. The other set is a supplementary query set which only contains queries. The supplementary query set is used for subsequently expanding the relevant positive and negative text examples.

The relevant negative text examples corresponding to the query in the initial training data may be randomly selected from a candidate text set, for example, 4 candidate texts are randomly selected from the candidate text set for each query as the relevant negative text examples corresponding to the query.

502: training a dual model using the initial training data to obtain an initial retrieval model which is denoted as DM0.

Since the initial training data has a small number of samples, in this step, a small batch of negative example data is actually used for the training operation.

Figure 6A:
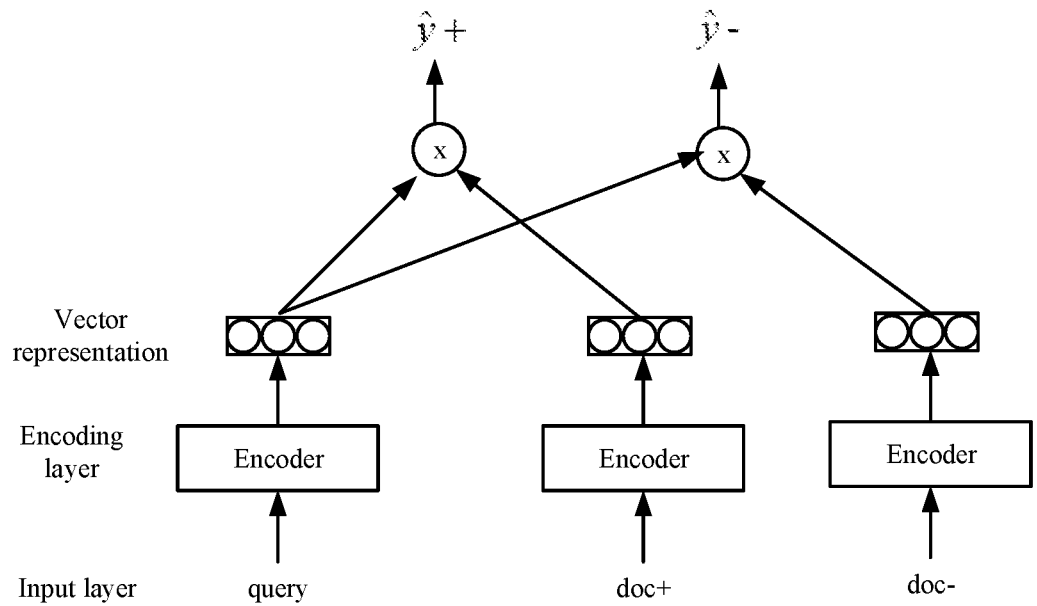
FIGS. 6a and 6b are schematic diagrams of training operations of the dual model and the cross attention model according to an embodiment of the present application.

When the dual model is trained, as shown in FIG. 6a, it is assumed that n training samples exist in the training data, and are represented as <query, doc+, doc−>. The doc+ and doc− represent the relevant positive text examples and the relevant negative text examples corresponding to the query respectively.

The query, each doc+ and each doc− are encoded by the dual model respectively, and using n pieces of training data, the correlation degrees between the query and $2n$ relevant texts may be calculated by the dual model respectively, and the $2n$ relevant texts include the relevant positive text examples and the relevant negative text examples corresponding to the query, as well as the relevant positive text examples and the relevant negative text examples corresponding to other queries. The training process has a training target that the correlation degree between the query output by the dual model and doc+ corresponding to the query is greater than the correlation degrees between the query and other relevant texts in the initial training data. That is, the correlation degree between the query and its corresponding doc+ is the maximum value among $2n$ correlation degrees.

The above-mentioned steps 501 and 502 may be regarded as an initial retrieval-model training process. Since the small batch of negative example data is adopted in the process and selected randomly, the quantity and quality of the negative example data are unable to enable the retrieval model to achieve a good effect, and therefore, at least one subsequent training process is required to be performed to further improve the effect of the retrieval model. In the present embodiment, two rounds of training are further performed, for example. The first round of training includes the following steps 503-506.

503: updating the relevant negative text examples for each query in the training data by DM0, so as to generate updated training data which is denoted as Data1.

As a preferred implementation, the correlation degree between the query in the training data and each candidate text may be determined by DM0, and M2 texts are randomly selected from the M1 candidate texts with top correlation degree scores to update the relevant negative text examples corresponding to the query, both M1 and M2 being positive integers, and M1>M2.

For example, the correlation degree between the query in the training data and each candidate text in a candidate database is determined by DM0, the top 1000 candidate texts are used as a candidate set according to the correlation degree score, the relevant positive text examples of each query are still manually annotated data, and 4 relevant negative text examples are randomly selected from the above-mentioned obtained candidate set.

The accurate relevant positive text examples and the relevant negative text examples which are selected randomly already enable DM0 obtained by the training operation to have a certain effect, such that DM0 may be used for determining a part of negative examples strongly relevant to the query from the candidate texts, and the quality of the training data is improved after the training data is updated using the negative examples which are strongly relevant.

504: training a cross attention model using the updated training data to obtain a first retrieval model which is denoted as CM1.

Figure 6B:
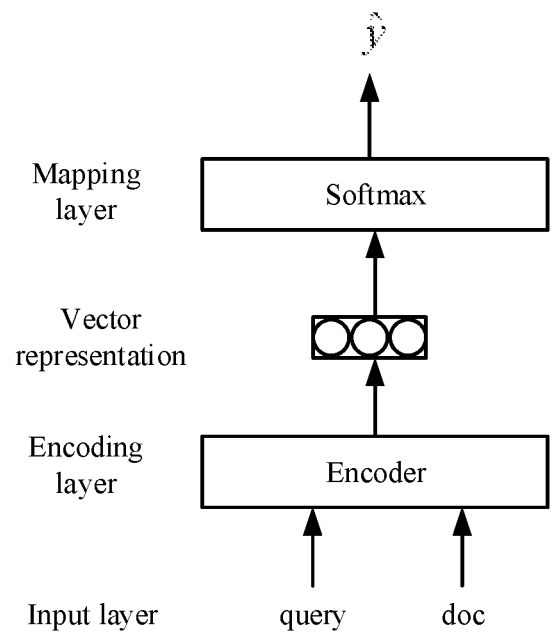

When the cross attention model is trained, as shown in FIG. 6b, the input is <query, doc+> and <query, doc−>, the cross attention model splices the input query and doc (doc+ or doc−), then encodes the input query and doc together, and performs a softmax mapping operation on the encoded result to obtain the correlation degree score $\hat{y}$ of the query and doc. The training process of the cross attention model may be regarded as a binary classification problem; that is, doc is classified according to the correlation degree output by the cross attention model, and the classification result y includes relevance corresponding to a positive example and irrelevance corresponding to a negative example. Thus, the training process may have a training target that the correlation degree between the query and corresponding doc+ in the training data obtained by the cross attention model is greater than or equal to a preset threshold, and the correlation degree between the query and corresponding doc− is less than the preset threshold. That is, ideally, the classification result of doc+ by the cross attention model is relevance, and the classification result of doc− by the cross attention model is irrelevance.

505: expanding the relevant positive text examples and the relevant negative text examples in the current training data by CM1, so as to obtain expanded training data which is denoted as Data2.

As a preferred implementation, DM0 may be used to retrieve relevant texts of the query in the training data from the candidate texts; and CM1 may be used to determine the correlation degrees of the relevant texts with the query, and the texts with the correlation degrees greater than or equal to a preset first threshold are used to expand the relevant positive text examples corresponding to the query, and the texts with the correlation degrees less than or equal to a preset second threshold are used to expand the relevant negative text examples corresponding to the query. The first threshold is greater than the second threshold, for example, the first threshold is 0.9, and the second threshold is 0.1.

Since the cross attention model CM1 judges the correlation degree more accurately, reliable relevant positive text examples and relevant negative text examples may be selected in cooperation with proper threshold setting. Expansion of the training data in this way equivalently means that the capability of CM1 is delivered to DM0 to obtain DM1, which may remarkably improve the effect of the dual model.

506: further training DM0 using the expanded training data to obtain a second retrieval model which is denoted as DM1.

DM1 is obtained by further training DM0 with the expanded training data. This way may optimize and speed up the process of training the retrieval model. The specific training process is the same as the way of training DM0 in the above-mentioned step 502, and is not repeated herein.

The second training process includes the following steps 507-510.

507: updating the relevant negative text examples for each query in the training data by DM1, so as to generate updated training data which is denoted as Data3.

As a preferred implementation, the correlation degrees between the query in the current training data and the candidate texts may be determined by DM1; N2 candidate texts are selected at an interval of N1 candidate texts according to the ranked correlation degrees; and then, the candidate texts with the similarity to the relevant positive text examples corresponding to the query greater than or equal to a preset similarity threshold are filtered out from the selected N2 candidate texts, and the obtained candidate texts are used to update the relevant negative text examples corresponding to the query. N1 and N2 are preset positive integers.

The selection way of the relevant negative text examples in this step is stricter than the selection way in the step 503. After ranked based on the correlation degrees determined by DM1, the candidate texts may be selected at an interval of 10 candidate texts. This processing mode may effectively avoid the condition that a large number of similar texts appear in the candidate texts, thereby improving the quality of the relevant negative text examples. Then, the candidate texts with high similarity to the relevant positive text examples corresponding to the query are further filtered out from the selected candidate texts. This processing mode may effectively avoid influences on the effect of the retrieval model caused by wrong selection of missed positive examples as the relevant negative text examples under some conditions. For example, 4 relevant negative text examples are finally formed to replace the relevant negative text examples in the training sample corresponding to the query. With the processing mode of this step, the negative examples with higher quality may be obtained, thereby facilitating the judgment of the retrieval model obtained by the training operation on a difficult sample.

508: further training CM1 using the updated training data to obtain a third retrieval model which is denoted as CM2.

The CM2 in this step is obtained by further training the trained CM1 using the updated training data. This way may optimize and speed up the process of training the retrieval model. The specific training process is similar to the process of training CM1 in the above-mentioned step 504, and is not repeated herein.

509: expanding the relevant positive text examples and the relevant negative text examples in the current training data by CM2, so as to obtain expanded training data which is denoted as Data4.

As a preferred implementation, DM1 may be used to retrieve the relevant texts of the query in the current training data from the candidate texts; CM2 may be used to determine the similarity of the relevant texts with each supplementary query, and the texts with the similarity greater than or equal to a preset first threshold are used as the relevant positive text examples corresponding to each supplementary query, and the texts with the similarity less than or equal to a preset second threshold are used as the relevant negative text examples corresponding to each supplementary query; and the training data is expanded using the relevant positive text examples and the relevant negative text examples corresponding to each supplementary query.

The expansion way in this step is similar to the expansion way in the step 505, except that in this step, expansion is performed using an expansion query set to obtain more relevant positive text examples and more relevant negative text examples, thereby obtaining a better model training effect.

510: further training DM1 using the expanded training data to obtain a fourth retrieval model which is denoted as DM2.

In this step, DM2 is obtained by further training DM1 with the expanded training data. This way may optimize and speed up the process of training the retrieval model. The specific training process is similar to the process of training DM1 in the above-mentioned step 506, and is not repeated herein.

At this point, the fourth retrieval model DM2 in the embodiment of the present application may be used as the final retrieval model, and the retrieval model is configured to, after the query of a user is input into the retrieval model, obtain the correlation degree between the query and each candidate text, and determine the relevant text of the query according to the correlation degree. A server may return the relevant text of the query as a retrieval result to a terminal device.

The method according to the embodiment of the present application is described above in detail, and an apparatus according to the present application will be described below in detail in conjunction with an embodiment.

FIG. 7 is a structural diagram of an apparatus for training a retrieval model according to an embodiment of the present application; the apparatus may be configured as an application located at a server, or a functional unit, such as a plug-in or software development kit (SDK) located in the application of the server, or the like, or be located at a computer terminal with high computing power, which is not particularly limited in the embodiment of the present disclosure. As shown in FIG. 7, the apparatus may include an initial acquiring unit 01, an initial training unit 02, a first updating unit 03, a first training unit 04, a first expanding unit 05 and a second training unit 06. The main functions of each constitutional unit are as follows.

The initial acquiring unit 01 is configured to acquire initial training data, the initial training data including queries and relevant positive text examples and relevant negative text examples corresponding to the queries.

As a preferred implementation, the relevant positive text examples in the initial training data are annotated manually, and the relevant negative text examples are selected from candidate texts randomly.

The initial training unit 02 is configured to perform a training operation using the initial training data to obtain an initial retrieval model.

As a preferred implementation, the initial training unit 02 may use the initial training data to train a dual model to obtain the initial retrieval model, with a training target that the correlation degree between the query output by the dual model and the relevant positive text examples corresponding to the query is greater than the correlation degrees between the query and other relevant texts in the initial training data.

The first updating unit 03 is configured to select texts with the correlation degrees with the query in the training data meeting a preset first requirement from candidate texts using the initial retrieval model, so as to update the relevant negative text examples corresponding to the query.

As a preferred implementation, the first updating unit 03 uses the initial retrieval model to determine the correlation degree between the query and each candidate text, and randomly selects M2 texts from the M1 candidate texts with top correlation degree scores to update the relevant negative text examples corresponding to the query, both M1 and M2 being positive integers, and M1>M2.

The first training unit 04 is configured to perform a training operation using the training data updated by the first updating unit 03 to obtain a first retrieval model.

As a preferred implementation, the first training unit 04 may use the training data updated by the first updating unit 03 to train a cross attention model to obtain the first retrieval model, with a training target that the correlation degree between the query in the training data obtained by the cross attention model and the relevant positive text examples corresponding to the query is greater than or equal to a preset threshold, and the correlation degree between the query and the relevant negative text examples corresponding to the query is less than the preset threshold.

The first expanding unit 05 is configured to select texts with the correlation degrees with the query in the training data meeting a preset second requirement from the candidate texts using the first retrieval model, so as to expand the relevant positive text examples corresponding to the query, and/or select texts with the correlation degrees with the query meeting a preset third requirement, so as to expand the relevant negative text examples corresponding to the query.

As a preferred implementation, the first expanding unit 05 may use the initial retrieval model to retrieve relevant texts of the query in the training data from the candidate texts; and use the first retrieval model to determine the correlation degrees of the relevant texts with the query, and use the texts with the correlation degrees greater than or equal to a preset first threshold to expand the relevant positive text examples corresponding to the query, and/or the texts with the correlation degrees less than or equal to a preset second threshold to expand the relevant negative text examples corresponding to the query, the first threshold being greater than the second threshold.

The second training unit 06 is configured to perform a training operation using the training data expanded by the first expanding unit to obtain a second retrieval model.

As a preferred implementation, the second training unit 06 may use the training data expanded by the first expanding unit 05 to further train the dual model, so as to obtain the second retrieval model.

Figure 7A:
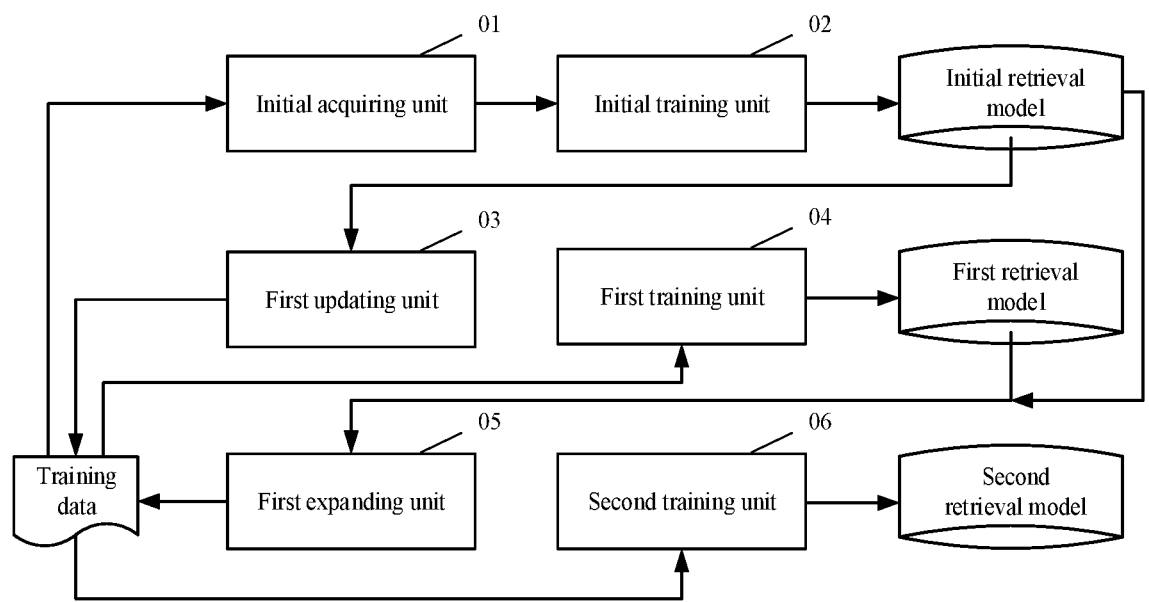
FIG. 7a is a structural diagram of an apparatus for training a retrieval model according to an embodiment of the present application.
Figure 7B:
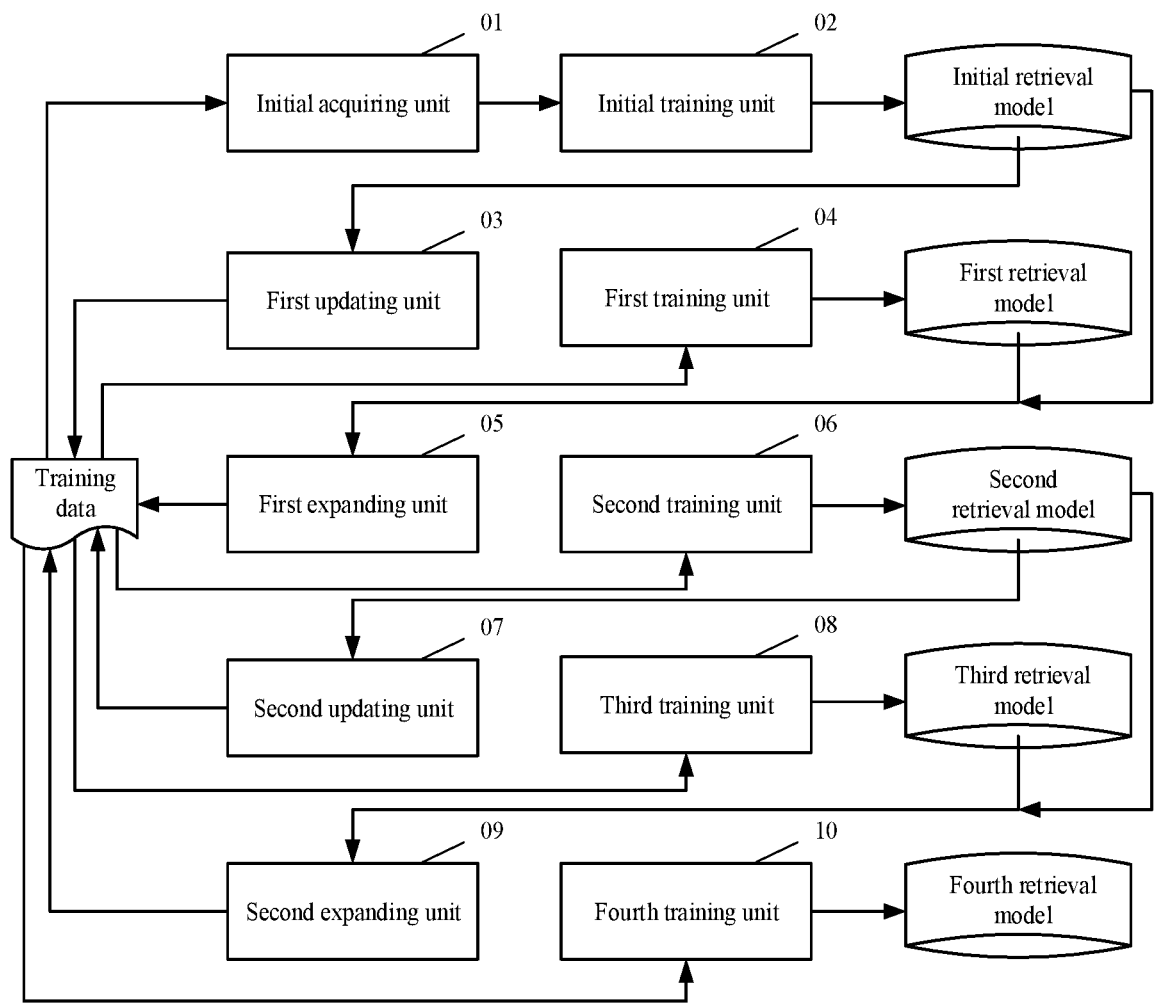
FIG. 7b is another structural diagram of the apparatus for training a retrieval model according to the embodiment of the present application.

FIG. 7b is a schematic structural diagram of another apparatus according to an embodiment of the present application; in the present embodiment, the apparatus may further include, in addition to the units and structures shown in FIG. 7a: a second updating unit 07, a third training unit 08, a second expanding unit 09 and a fourth training unit 10.

The second updating unit 07 is configured to select texts with the correlation degrees with the query in the training data meeting a preset fourth requirement from the candidate texts using the second retrieval model, so as to update the relevant negative text examples corresponding to the query; and perform a training operation using the updated training data to obtain a third retrieval model.

As a preferred implementation, the second updating unit 07 may determine the correlation degrees between the query and the candidate texts by the second retrieval model; select N2 candidate texts at an interval of N1 candidate texts according to the ranked correlation degrees; and filter out the candidate texts with the similarity to the relevant positive text examples corresponding to the query greater than or equal to a preset similarity threshold from the selected N2 candidate texts, and use the obtained candidate texts to update the relevant negative text examples corresponding to the query, N1 and N2 being preset positive integers.

The third training unit 08 is configured to perform a training operation using the training data updated by the second updating unit 07 to obtain a third retrieval model.

As a preferred implementation, the third training unit 08 may use the updated training data to further train the first retrieval model, so as to obtain the third retrieval model.

The second expanding unit 09 may select texts with the correlation degrees with each supplementary query meeting a preset fifth requirement from the candidate texts using the third retrieval model, so as to generate relevant positive text examples corresponding to each supplementary query, and/or select texts with the correlation degrees with each supplementary query meeting a preset sixth requirement, so as to generate relevant negative text examples corresponding to each supplementary query; expand the training data with the relevant positive text examples and/or the relevant negative text examples corresponding to each supplementary query.

As a preferred implementation, the second expanding unit 09 is configured to use the second retrieval model to retrieve the relevant texts of the query in the training data from the candidate texts; and use the third retrieval model to determine the similarity of the relevant texts with each supplementary query, and use the texts with the similarity greater than or equal to a preset first threshold as the relevant positive text examples corresponding to each supplementary query, and/or the texts with the similarity less than or equal to a preset second threshold as the relevant negative text examples corresponding to each supplementary query.

The fourth training unit 10 is configured to perform a training operation using the training data expanded by the second expanding unit 09 to obtain a fourth retrieval model.

As a preferred implementation, the fourth training unit 10 may use the expanded training data to further train the second retrieval model, so as to obtain the fourth retrieval model.

According to the embodiment of the present application, there are also provided an electronic device and a readable storage medium.

Figure 8:
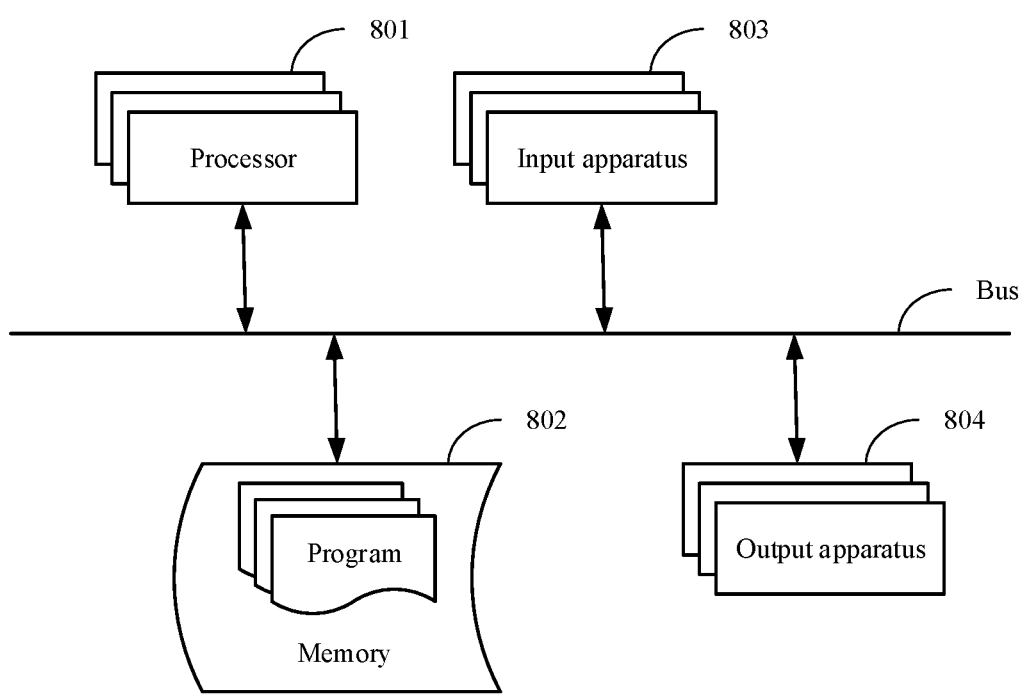
FIG. 8 is a block diagram of an electronic device configured to implement the embodiment of the present application.

FIG. 8 is a block diagram of an electronic device for a method for training a retrieval model according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 8, the electronic device includes one or more processors 801, a memory 802, and interfaces configured to connect the components, including high-speed interfaces and low-speed interfaces. The components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 8, one processor 801 is taken as an example.

The memory 802 is configured as the non-transitory computer readable storage medium according to the present application. The memory stores instructions executable by the at least one processor to cause the at least one processor to perform a method for training a retrieval model according to the present application. The non-transitory computer readable storage medium according to the present application stores computer instructions for causing a computer to perform the method for training a retrieval model according to the present application.

The memory 802 which is a non-transitory computer readable storage medium may be configured to store non-transitory software programs, non-transitory computer executable programs and modules, such as program instructions/modules corresponding to the method for training a retrieval model according to the embodiment of the present application. The processor 801 executes various functional applications and data processing of a server, that is, implements the method for training a retrieval model according to the above-mentioned embodiments, by running the non-transitory software programs, instructions, and modules stored in the memory 802.

The memory 802 may include a program storage area and a data storage area, wherein the program storage area may store an operating system and an application program required for at least one function; the data storage area may store data created according to use of the electronic device, or the like. Furthermore, the memory 802 may include a high-speed random access memory, or a non-transitory memory, such as at least one magnetic disk storage device, a flash memory device, or other non-transitory solid state storage devices. In some embodiments, optionally, the memory 802 may include memories remote from the processor 801, and such remote memories may be connected to the electronic device via a network. Examples of such a network include, but are not limited to, the Internet, intranets, local area networks, mobile communication networks, and combinations thereof.

The electronic device may further include an input apparatus 803 and an output apparatus 804. The processor 801, the memory 802, the input apparatus 803 and the output apparatus 804 may be connected by a bus or other means, and FIG. 8 takes the connection by a bus as an example.

The input apparatus 803 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 804 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, application specific integrated circuits (ASIC), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLD)) for providing machine instructions and/or data for a programmable processor, including a machine readable medium which receives machine instructions as a machine readable signal. The term "machine readable signal" refers to any signal for providing machine instructions and/or data for a programmable processor.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other.

It should be understood that various forms of the flows shown above may be used and reordered, and steps may be added or deleted. For example, the steps described in the present application may be executed in parallel, sequentially, or in different orders, which is not limited herein as long as the desired results of the technical solution disclosed in the present application may be achieved.

The above-mentioned implementations are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for training a retrieval model, comprising:
   acquiring initial training data, the initial training data comprising queries and relevant positive text examples and relevant negative text examples corresponding to the queries; and performing a training operation using the initial training data to obtain an initial retrieval model;
   selecting texts with the correlation degrees with the query in the training data meeting a preset first requirement from candidate texts using the initial retrieval model, so as to update the relevant negative text examples corresponding to the query; and performing a training operation using the updated training data to obtain a first retrieval model; and selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the expanded training data to obtain a second retrieval model, wherein the performing a training operation using the updated training data to obtain a first retrieval model comprises:

using the updated training data to train a cross attention model to obtain the first retrieval model, with a training target being that the correlation degree between the query in the training data obtained by the cross attention model and the relevant positive text examples corresponding to the query is greater than or equal to a preset threshold, and the correlation degree between the query and the relevant negative text examples corresponding to the query is less than the preset threshold.

2. The method according to claim 1, wherein the relevant positive text examples in the initial training data are annotated manually, and the relevant negative text examples are selected from candidate texts randomly.

3. The method according to claim 1, wherein the performing a training operation using the initial training data to obtain an initial retrieval model comprises:

using the initial training data to train a dual model to obtain the initial retrieval model, with a training target being that the correlation degree between the query output by the dual model and the relevant positive text examples corresponding to the query is greater than the correlation degrees between the query and other relevant texts in the initial training data.

4. The method according to claim 1, wherein the selecting texts with the correlation degrees with the query in the training data meeting a preset first requirement from candidate texts using the initial retrieval model, so as to update the relevant negative text examples corresponding to the query comprises:

using the initial retrieval model to determine the correlation degree between the query and each candidate text, and randomly selecting M2 texts from the M1 candidate texts with top correlation degree scores to update the relevant negative text examples corresponding to the query;

wherein both M1 and M2 are positive integers, and M1>M2.

5. The method according to claim 1, wherein the selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query comprises:

retrieving relevant texts of the query in the training data from the candidate texts using the initial retrieval model; and determining the correlation degrees of the relevant texts with the query using the first retrieval model, and using the texts with the correlation degrees greater than or equal to a preset first threshold to expand the relevant positive text examples corresponding to the query, and/or the texts with the correlation degrees less than or equal to a preset second threshold to expand the relevant negative text examples corresponding to the query, the first threshold being greater than the second threshold.

6. The method according to claim 3, wherein the performing a training operation using the expanded training data to obtain a second retrieval model comprises:

using the expanded training data to further train the dual model, so as to obtain the second retrieval model.

7. The method according to claim 1, further comprising:

selecting texts with the correlation degrees with the query in the training data meeting a preset fourth requirement from candidate texts using the second retrieval model, so as to update the relevant negative text examples corresponding to the query; and performing a training operation using the updated training data to obtain a third retrieval model; and selecting texts with the correlation degrees with each supplementary query meeting a preset fifth requirement from the candidate texts using the third retrieval model, so as to generate relevant positive text examples corresponding to each supplementary query, and/or selecting texts with the correlation degrees with each supplementary query meeting a preset sixth requirement, so as to generate relevant negative text examples corresponding to each supplementary query; expanding the training data with the relevant positive text examples and/or the relevant negative text examples corresponding to each supplementary query; and performing a training operation using the expanded training data to obtain a fourth retrieval model.

8. The method according to claim 7, wherein the selecting texts with the correlation degrees with the query in the training data meeting a preset fourth requirement from candidate texts using the second retrieval model, so as to update the relevant negative text examples corresponding to the query comprises:

determining the correlation degrees between the query and the candidate texts using the second retrieval model;

selecting N2 candidate texts at an interval of N1 candidate texts according to the ranked correlation degrees; and filtering out the candidate texts with the similarity to the relevant positive text examples corresponding to the query greater than or equal to a preset similarity threshold from the selected N2 candidate texts, and using the obtained candidate texts to update the relevant negative text examples corresponding to the query, N1 and N2 being preset positive integers.

9. The method according to claim 7, wherein the selecting texts with the correlation degrees with each supplementary query meeting a preset fifth requirement from the candidate texts using the third retrieval model, so as to generate relevant positive text examples corresponding to each supplementary query, and/or selecting texts with the correlation degrees with each supplementary query meeting a preset sixth requirement, so as to generate relevant negative text examples corresponding to each supplementary query comprises:

retrieving relevant texts of the query in the training data from the candidate texts using the second retrieval model; and using the third retrieval model to determine the similarity of the relevant texts with each supplementary query, and using the texts with the similarity greater than or equal to a preset first threshold as the relevant positive text examples corresponding to each supplementary query, and/or the texts with the similarity less than or equal to a preset second threshold as the relevant negative text examples corresponding to each supplementary query.

10. The method according to claim 7, wherein the performing a training operation using the updated training data to obtain a third retrieval model comprises:

using the updated training data to further train the first retrieval model, so as to obtain the third retrieval model; and the performing a training operation using the expanded training data to obtain a fourth retrieval model comprises:

using the expanded training data to further train the second retrieval model, so as to obtain the fourth retrieval model.

11. An electronic device, comprising:

at least one processor; and a memory communicatively connected with the at least one processor;

wherein the memory stores instructions executable by the at least one processor, and the instructions are executed by the at least one processor to enable the at least one processor to perform a method for training a retrieval model, wherein the method comprises:

acquiring initial training data, the initial training data comprising queries and relevant positive text examples and relevant negative text examples corresponding to the queries; and performing a training operation using the initial training data to obtain an initial retrieval model;

selecting texts with the correlation degrees with the query in the training data meeting a preset first requirement from candidate texts using the initial retrieval model, so as to update the relevant negative text examples corresponding to the query; and performing a training operation using the training data updated by the first updating unit to obtain a first retrieval model;

selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the training data expanded by the first expanding unit to obtain a second retrieval model, wherein the performing a training operation using the updated training data to obtain a first retrieval model comprises:

using the updated training data to train a cross attention model to obtain the first retrieval model, with a training target being that the correlation degree between the query in the training data obtained by the cross attention model and the relevant positive text examples corresponding to the query is greater than or equal to a preset threshold, and the correlation degree between the query and the relevant negative text examples corresponding to the query is less than the preset threshold.

12. The electronic device according to claim 11, wherein the relevant positive text examples in the initial training data are annotated manually, and the relevant negative text examples are selected from candidate texts randomly.

13. The electronic device according to claim 11, wherein the performing a training operation using the initial training data to obtain an initial retrieval model comprises:

using the initial training data to train a dual model to obtain the initial retrieval model, with a training target being that the correlation degree between the query output by the dual model and the relevant positive text examples corresponding to the query is greater than the correlation degrees between the query and other relevant texts in the initial training data.

14. The electronic device according to claim 11, wherein the selecting texts with the correlation degrees with the query in the training data meeting a preset first requirement from candidate texts using the initial retrieval model, so as to update the relevant negative text examples corresponding to the query comprises:

using the initial retrieval model to determine the correlation degree between the query and each candidate text, and randomly selecting M2 texts from the M1 candidate texts with top correlation degree scores to update the relevant negative text examples corresponding to the query;

wherein both M1 and M2 are positive integers, and M1>M2.

15. The electronic device according to claim 11, wherein the selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query comprises:

retrieving relevant texts of the query in the training data from the candidate texts using the initial retrieval model; and determining the correlation degrees of the relevant texts with the query using the first retrieval model, and using the texts with the correlation degrees greater than or equal to a preset first threshold to expand the relevant positive text examples corresponding to the query, and/or the texts with the correlation degrees less than or equal to a preset second threshold to expand the relevant negative text examples corresponding to the query, the first threshold being greater than the second threshold.

16. The electronic device according to claim 13, wherein the performing a training operation using the expanded training data to obtain a second retrieval model comprises:

using the expanded training data to further train the dual model, so as to obtain the second retrieval model.

17. The electronic device according to claim 11, further comprising:

selecting texts with the correlation degrees with the query in the training data meeting a preset fourth requirement from candidate texts using the second retrieval model, so as to update the relevant negative text examples corresponding to the query; and performing a training operation using the updated training data to obtain a third retrieval model; and selecting texts with the correlation degrees with each supplementary query meeting a preset fifth requirement from the candidate texts using the third retrieval model, so as to generate relevant positive text examples corresponding to each supplementary query, and/or selecting texts with the correlation degrees with each supplementary query meeting a preset sixth requirement, so as to generate relevant negative text examples corresponding to each supplementary query; expanding the training data with the relevant positive text examples and/or the relevant negative text examples corresponding to each supplementary query; and performing a training operation using the expanded training data to obtain a fourth retrieval model.

18. A non-transitory computer readable storage medium with computer instructions stored thereon, wherein the computer instructions are used for causing a computer to perform a method for training a retrieval model, wherein the method comprises:

acquiring initial training data, the initial training data comprising queries and relevant positive text examples and relevant negative text examples corresponding to the queries;

and performing a training operation using the initial training data to obtain an initial retrieval model;

selecting texts with the correlation degrees with the query in the training data meeting a preset first requirement from candidate texts using the initial retrieval model, so as to update the relevant negative text examples corresponding to the query; and performing a training operation using the updated training data to obtain a first retrieval model; and selecting texts with the correlation degrees with the query in the training data meeting a preset second requirement from the candidate texts using the first retrieval model, so as to expand the relevant positive text examples corresponding to the query, and/or selecting texts with the correlation degrees with the query meeting a preset third requirement, so as to expand the relevant negative text examples corresponding to the query; and performing a training operation using the expanded training data to obtain a second retrieval model, wherein the performing a training operation using the updated training data to obtain a first retrieval model comprises:

using the updated training data to train a cross attention model to obtain the first retrieval model, with a training target being that the correlation degree between the query in the training data obtained by the cross attention model and the relevant positive text examples corresponding to the query is greater than or equal to a preset threshold, and the correlation degree between the query and the relevant negative text examples corresponding to the query is less than the preset threshold.

* * * * *